United States Patent
Gauvin

(10) Patent No.: US 7,577,952 B2
(45) Date of Patent: Aug. 18, 2009

(54) COMMON STATE SEQUENCES IN A FINITE STATE MACHINE

(75) Inventor: Jeffrey J. Gauvin, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 679 days.

(21) Appl. No.: 10/452,472

(22) Filed: May 30, 2003

(65) Prior Publication Data

US 2004/0244002 A1 Dec. 2, 2004

(51) Int. Cl.
*G06F 9/46* (2006.01)
*G06F 7/38* (2006.01)

(52) U.S. Cl. .............. 718/100; 718/102; 718/108; 712/220; 712/228; 712/232

(58) Field of Classification Search .......... 718/102, 718/108, 100; 326/46; 712/232, 220, 228
See application file for complete search history.

(56) References Cited

U.S. PATENT DOCUMENTS

| 6,341,367 B1 * | 1/2002 | Downing ............... 716/16 |
| 6,934,832 B1 * | 8/2005 | Van Dyke et al. ......... 712/244 |
| 2003/0120712 A1 * | 6/2003 | Reid ..................... 709/107 |
| 2004/0205747 A1 * | 10/2004 | Bernstein et al. ........ 717/174 |

* cited by examiner

*Primary Examiner*—Van H Nguyen
*Assistant Examiner*—Kenneth Tang
(74) *Attorney, Agent, or Firm*—William W. Cochran; Cochran Freund & Young LLC

(57) ABSTRACT

A state machine may have a sequence that is called by multiple threads within the state machine. Prior to calling the sequence, an address specific to the current state is stored in an address register. After the sequence has executed, the address register is queried and the thread may continue. Many different threads may call the sequence. In more complex hardware implemented state machines, the total number of gates may be reduced significantly.

12 Claims, 4 Drawing Sheets

SHARED ROUTINE IN A STATE MACHINE case (current_state)

FIRST THREAD 302
- State X1: begin
  ⋮
  return_addr <= state X2; —— 308
  next_state <= sub1; —— 310
  end
- State X2: begin —— 312
  ⋮
  end SECOND THREAD 304
- State Y1: begin
  ⋮
  return_addr <= state Y2; —— 314
  next_state <= sub1; —— 316
  end
- State Y2: begin —— 318
  ⋮
  end SHARED ROUTINE 306
- Sub1: begin —— 320
  ⋮
  next_state <= return_addr; —— 322
  end End case

300
PSEUDO-CODE OF A
SHARED ROUTINE IN A
STATE MACHINE

FIGURE 3

COMMON STATE SEQUENCES IN A FINITE STATE MACHINE

BACKGROUND OF THE INVENTION a. Field of the Invention

The present invention pertains to computational devices and specifically to programming of state machines.

b. Description of the Background

State machines are computational devices that are used for many low-level functions in today's computers. Many routine, repetitive sequences such as communications handshaking can be quickly and efficiently implemented in a finite state machine. Further, since the state machine can be implemented in hardware, using a series of gates and other hardware devices, the speed and reliability of the state machine can be very high.

State machines are frequently incorporated into integrated circuit devices. It is common for an integrated circuit to have a state machine plus other circuitry and other functionality. Space on an integrated circuit may be limited so that it may be desirable to make the state machine from the smallest number of gates and thus minimize the space it occupies on the integrated circuit.

When several state machines are used in conjunction with each other, some handshaking may occur between the state machines as they communicate with each other. The handshaking may cause some latency in operations and may further complicate the overall implementation.

It would therefore be advantageous to provide a system and method for reducing the number of gates required for large, complex state machines. It would be further advantageous if the functionality of several state machines could be combined so that faster, more efficient operations are achieved.

SUMMARY OF THE INVENTION

The present invention overcomes the disadvantages and limitations of the prior art by providing a system and method for common state sequences in a state machine. A sequence may be invoked by various states in a state machine. An address is stored in an address register prior to calling the sequence. When the sequence is completed, the address register is queried to direct the operation back to the state prior to sequence being executed.

The present invention may therefore comprise a method of controlling the operation of a finite state machine comprising: providing an address register; providing a common routine, the common routine comprising a plurality of states; executing a first thread of execution, the first thread of execution comprising: storing a first value in the address register; stopping the first thread of execution; executing the common routine; retrieving the first value from the address register; and causing the first thread of execution to continue based on the first value stored in the address register; and, executing a second thread of execution, the second thread of execution comprising: storing a second value in the address register; stopping the second thread of execution; executing the common routine; retrieving the second value from the address register; and causing the second thread of execution to continue based on the second value stored in the address register.

The present invention may further comprise a method of creating logic for a finite state machine so as to minimize the number of states comprising: providing a first set of executable logic states; providing a second set of executable logic states; determining a subset of executable logic states that are common to the first set of executable logic states and the second set of executable logic states; creating a common set of executable logic states from the subset of executable logic states; creating an address register adapted to contain a pointer; adapting the first set of executable logic states to store a first pointer in the address register prior to executing the common set of executable logic states; adapting the second set of executable logic states to store a second pointer in the address register prior to executing the common set of executable logic states; adapting the common set of executable logic states to retrieve the pointer from the address register; and adapting the common set of executable logic states to continue executing one of the first set or the second set of executable logic states based upon the pointer within the address register.

The present invention may further comprise an integrated circuit comprising: a first series of gates arranged to perform a first set of actions; an address register; a second series of gates arranged to perform a first thread of actions, the first thread of actions comprising: storing a first value in the address register; stopping the first thread of actions; causing the first series of gates to perform the first set of actions; retrieving the first value from the address register; and causing the first thread of actions to continue based on the first value stored in the address register; and, a third series of gates arranged to perform a second thread of actions, the second thread of actions comprising: storing a second value in the address register; stopping the second thread of actions; causing the first series of gates to perform the first set of actions; retrieving the second value from the address register; and causing the second thread of actions to continue based on the second value stored in the address register.

The present invention may further comprise an integrated circuit comprising a state machine having a reduced number of gates comprising: a first set of executable logic states; a second set of executable logic states; a subset of executable logic states that are common to the first set of executable logic states and the second set of executable logic states; an address register adapted to contain a pointer; the first set of executable logic states adapted to store a first pointer in the address register prior to executing the subset of executable logic states; the second set of executable logic states adapted to store a second pointer in the address register prior to executing the subset of executable logic states; the subset of executable logic states adapted to retrieve the pointer from the address register; and the subset of executable logic states adapted to continue executing one of the first set or the second set of executable logic states based upon the pointer within the address register.

The advantages of the present invention are that a complex state machine may have repetitive sequences called by different states in the state machine. This reduces the number of gates required for the state machine because the sequence is not repeated several times. Further, the present invention reduces latency and overhead associated with separate state machines by combining all of the logic into one state machine.

BRIEF DESCRIPTION OF THE DRAWINGS

In the drawings,

FIG. 3 is an illustration of an embodiment of a pseudo-code representation of the present invention of a shared routine in a state machine.

DETAILED DESCRIPTION

Figure 1:
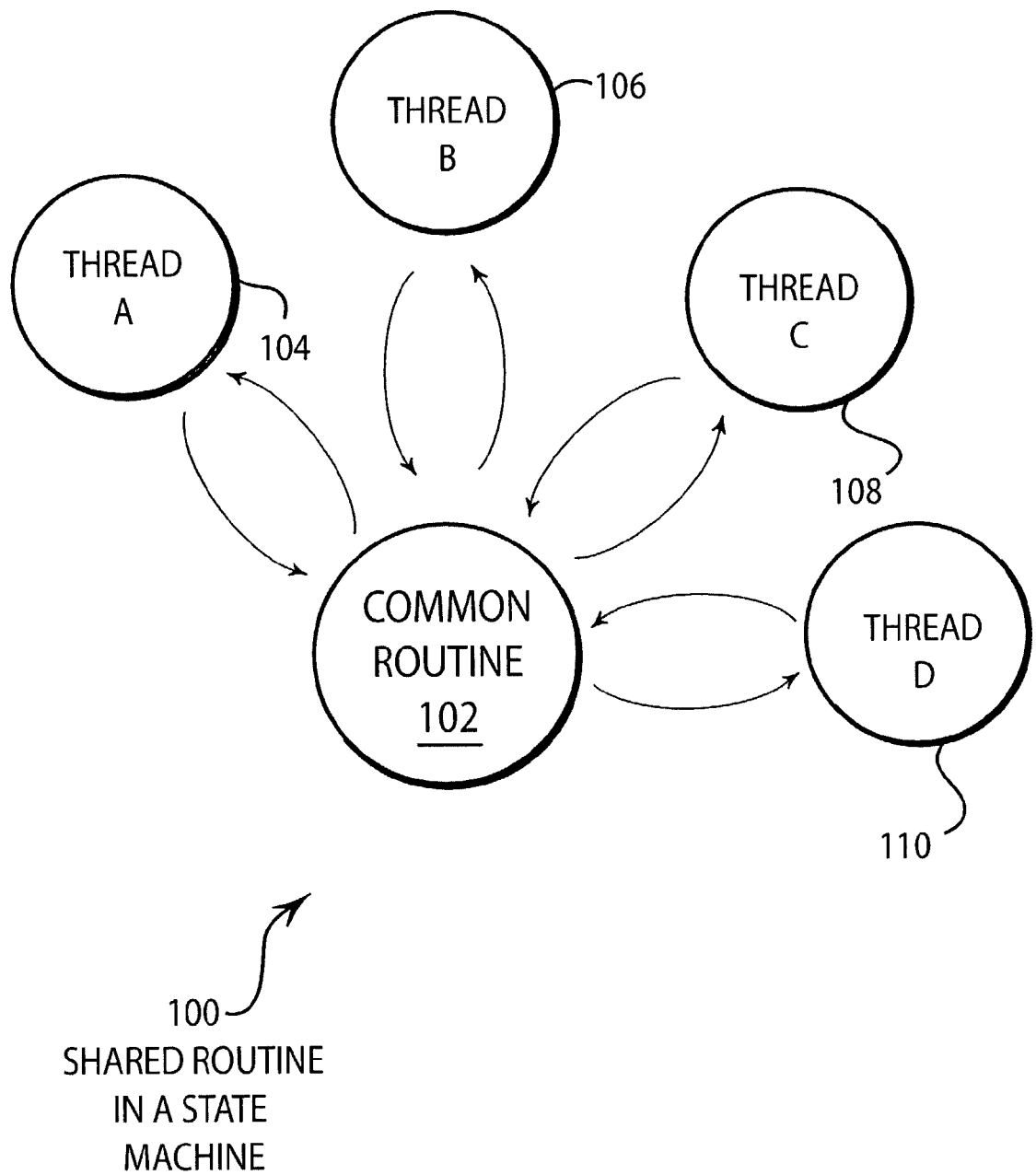
FIG. 1 is an illustration of an embodiment of the present invention of a shared routine in a state machine.

FIG. 1 illustrates an embodiment 100 of the present invention of a shared routine in a state machine. A common routine 102 may be executed by various threads 104, 106, 108, and 110. The routine 102 may be called by each of the threads and have control returned to the thread after the common routine 102 has completed execution.

The routine 102 may contain a sequence of states that needs to be executed in different threads of the state machine. For example, a state machine that is designed to handle a particular communications protocol may require a handshaking sequence to be executed by different threads. A thread that receives data may require that a series of handshaking lines to toggle in the same manner as a thread that transmits data. Both threads may call a common routine that performs the toggling sequence.

The control of the individual thread may be passed to the routine 102 and returned to that particular thread when the routine 102 has completed. A return address is stored prior to calling the routine 102. When the routine 102 is complete, the return address is used to direct the thread to continue.

Figure 2:
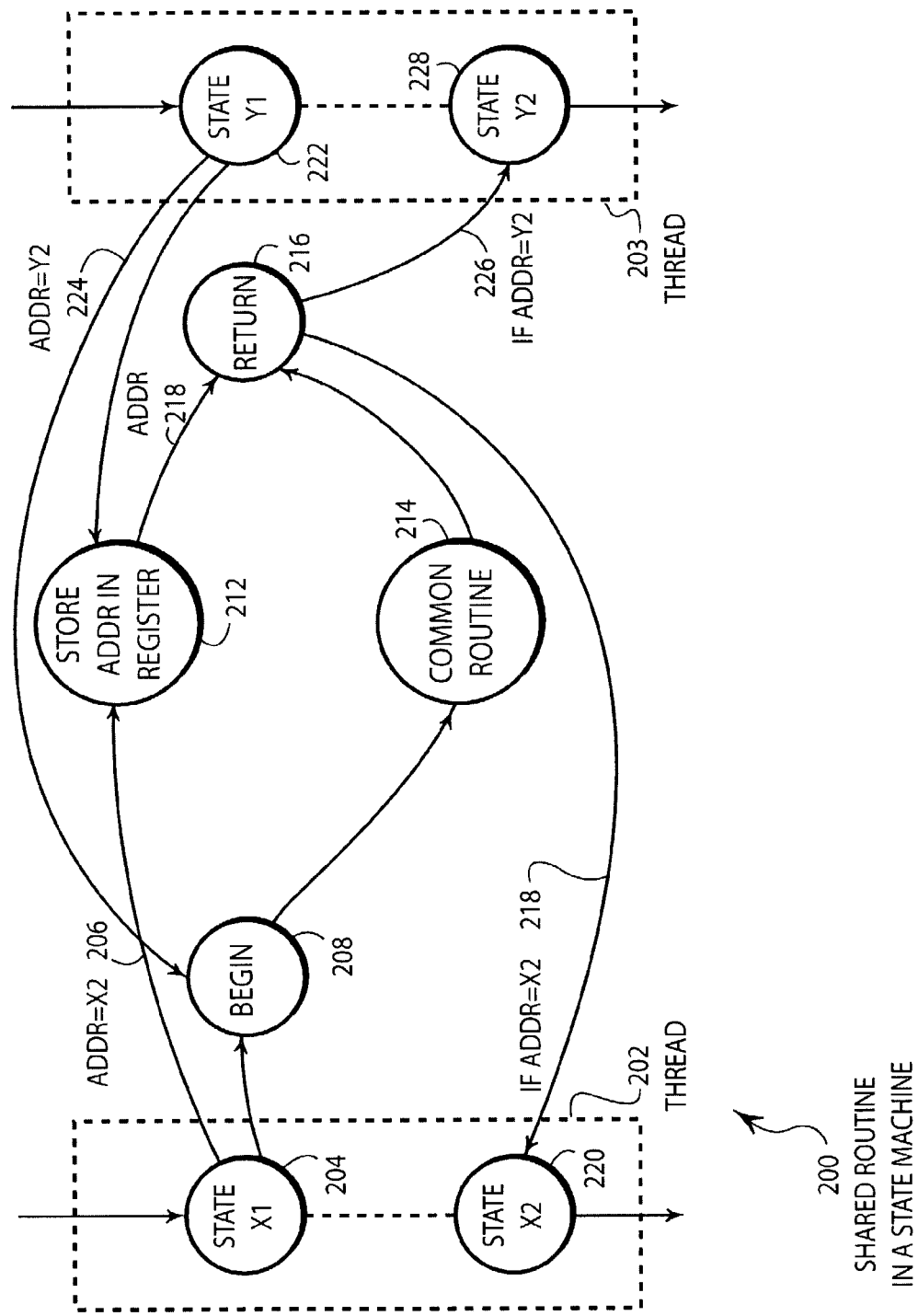
FIG. 2 is a more detailed illustration of an embodiment of the present invention of a shared routine in a state machine.

FIG. 2 illustrates an embodiment 200 of the present invention of a shared routine in a state machine. Two different execution threads 202 and 203 each pause execution, transfer execution control to the common routine 214, then pass the execution back to the respective thread. The thread 202 executed until state 204 at which the return address 206 is stored into register 212. The execution thread is passed to the begin state 208 and the set of common steps is executed 214. At the end of the common routine 214, the return function 216 refers to the register 212 to obtain an address 218. The result of the return function 216 is to transfer execution to state 220 based on the address 218.

The embodiment 200 allows a common routine 214 to be shared by a plurality of threads 202 and 203. A unique identifier for each thread 202 and 203 is stored in the address register 212 prior to executing the common routine 214. When the common routine 214 has completed execution, the value that is stored in the register 212 is used to direct the execution of the state machine back to the appropriate thread.

In some embodiments where there are only two threads that share a common routine 214, the register 212 may contain only one bit. In embodiments where more than two threads share a common routine 214, the register 212 may contain as many bits as necessary to be able to store a unique identifier for each thread. In some cases, an alphanumeric designation may be used while in other cases a binary combination of bits may be used.

The common routine 214 may be executed in series with states 204 and 220. In other embodiments, the common routine 214 may be executed in parallel with other states within the thread 202.

FIG. 3 illustrates an embodiment 300 of pseudo-code representation of the present invention of a shared routine in a state machine. A first thread 302 and a second thread 304 each cause a shared routine 306 to be executed. Within the first thread 302, the return address is stored with the continuation state X2 in line 308 and control is passed to the shared routine sub1 in line 310. State X2 is continued in line 312. Similarly, in second thread 304, the return address is stored with the continuation state Y2 in line 314 and control is passed to the shared routine sub1 in line 316. State Y2 is continued in line 318. The shared routine sub1 is begun in line 320. When the shared routine sub1 is completed, the next state is the value stored in the return address in line 322.

The embodiment 300 may be a series of instructions that is compiled into a series of gates that are created in an integrated circuit. By using a shared routine 306, the overall number of gates in the integrated circuit may be reduced, since the functionality of the shared routine 306 would have to have been duplicated for each of the threads 302 and 304.

Figure 4:
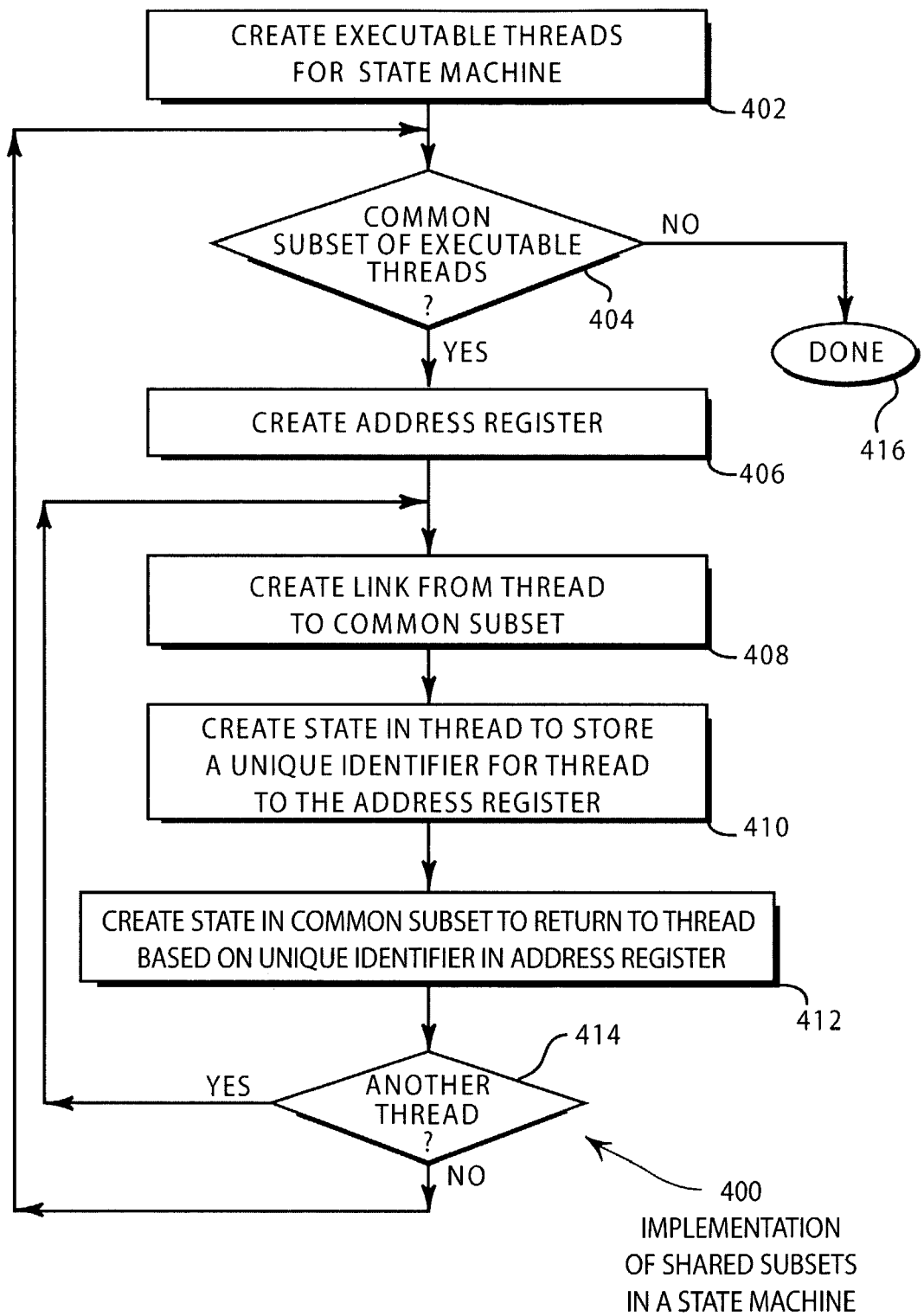
FIG. 4 is an illustration of an embodiment of a method for the implementation of shared subsets of routines in a state machine.

FIG. 4 illustrates an embodiment 400 of an implementation of shared subsets of routines in a state machine. Executable threads are created for a state machine in block 402. If a common subset of executable thread is identified in block 404, an address register for the subset be created in block 406. A link from the thread to the common subset is created in block 408 and a state in the thread is created to store a unique identifier for that thread into the address register in block 410. Within the common subset, a state is created to return to the thread based on the unique identifier in block 412. If another thread is identified in block 414, the process is repeated for that thread beginning in block 408. If no more threads are identified in block 414, another common subset of threads is evaluated in block 404. If none are found, the process stops in block 416.

The embodiment 400 may be executed manually by a programmer or may be an automated process designed to optimize the state machine by minimizing the number of gates required to implement a specific state machine.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of controlling the operation of a finite state machine comprising:

providing said finite state machine, said finite state machine comprising a plurality of threads of execution including at least a first thread of execution that is a first logical sequence of states and a second thread of execution that is a second logical sequence of states such that said first and said second logical sequences of states of said finite state machine are implemented using hardware logical gates and other hardware devices;

providing a common routine shared by said plurality of threads of execution, said common routine comprising a plurality of states combined as a common logical sequence of states such that said common logical sequence of states are implemented using hardware logical gates and other hardware devices;

providing an address register disposed to store an identifier for a return state of each thread of said finite state machine that transfers control to said common routine;

executing said first thread of execution, said first thread of execution comprising:

storing a first identifying value for a return state of said first thread of execution in said address register;

passing control of said first thread of execution to said common routine;

executing said common routine;

retrieving said first identifying value from said address register; and returning control to said first thread of execution to continue from said return state of said first identifying value stored in said address register;

and executing said second thread of execution, said second thread of execution comprising:

storing a second identifying value for a return state of said second thread of execution in said address register;

passing control of said second thread of execution to said common routine;

executing said common routine;

retrieving said second value from said address register; and returning control to said second thread of execution to continue from said state of said second identifying value stored in said address register.

2. The method of claim 1 wherein said finite state machine comprises a plurality of gates in an integrated circuit.

3. The method of claim 1 wherein said common routine is composed of a plurality of gates of an integrated circuit.

4. The method of claim 1 wherein said first thread is composed of a plurality of gates of an integrated circuit.

5. A method of creating the logic for a finite state machine so as to minimize the number of states comprising:

providing a plurality of sets of executable logic states comprising at least a first set of executable logic states implemented using hardware logical gates and other hardware devices and a second set of executable logic states implemented using hardware logical gates and other hardware devices, each executable set of logic states of said plurality of sets of executable logic states implementing a separate thread of execution such that said first set of executable logic states implements a first thread of execution and said second set of executable logic states implements a second thread of execution;

determining a shared subset of executable logic states that are common to said first set of executable logic states and said second set of executable logic states;

creating a common set of executable logic states shared by said plurality of sets of executable logic states from said shared subset of executable logic states implemented using hardware logical gates and other hardware devices such that said creating of said common set of executable logic states is done once for both said first set of executable logic states and said second set of executable logics gates minimizing said number of states for said finite state machine and thereby minimizing hardware logical gates and other hardware devices used to implement said finite state machine;

creating an address register adapted to contain a pointer to a return address of a return state of one of said plurality of executable logic states that is transferring control to said common set of executable logic states;

adapting said first set of executable logic states to store a first pointer to a return address to a return state of said first set of executable logic states in said address register prior to executing said common set of executable logic states;

adapting said second set of executable logic states to store a second pointer to a return address to a return state of said second set of executable logic states in said address register prior to executing said common set of executable logic states;

adapting said common set of executable logic states to retrieve said pointers from said address register; and adapting said common set of executable logic states to continue executing one of said first set or said second set of executable logic states from said return state of said pointer to said one of said plurality of executable logic states within said address register.

6. The method of claim 5 further comprising:

determining an arrangement of gates adapted to function as said state machine; and manufacturing said arrangement of gates in an integrated circuit.

7. An integrated circuit comprising a finite state machine comprising:

a first, common series of gates implemented using hardware logical gates and other hardware devices arranged to perform a common set of actions shared by a plurality of threads of actions;

an address register disposed to store a return address of a return state of one of said plurality of threads of actions;

a second series of gates implemented using hardware logical gates and other hardware devices arranged to perform a first thread of actions of said plurality of threads of actions, said first thread of actions comprising:

storing a first identifying value in said address register for a return state of said first thread of actions;

stopping said first thread of actions;

causing said first, common series of gates to perform said common set of actions;

retrieving said first identifying value from said address register;

causing said first thread of actions to continue from said return state of said first thread of actions identified by said first identifying value stored in said address register;

and a third series of gates implemented using hardware logical gates and other hardware devices arranged to perform a second thread of actions of a plurality of sets of actions, said second thread of actions comprising:

storing a second identifying value in said address register for a return state of said second thread of actions;

stopping said second thread of actions;

causing said first, common series of gates to perform said common set of actions;

retrieving said second identifying value from said address register; and causing said second thread of actions to continue from said return state of said second thread of actions identified by said second value stored in said address register.

8. An integrated circuit comprising a finite state machine having a reduced number of gates comprising:

a first set of executable logic states of a plurality of sets of executable logic states implemented using hardware logical gates and other hardware devices, each executable set of logic states of said plurality of sets of executable logic states implementing a separate thread of execution such that said first set of executable logic states implements a first thread of execution;

a second set of executable logic states of a plurality of sets of executable logic states implemented using hardware logical gates and other hardware devices such that said second set of executable logic states implements a second thread of execution;

a subset of executable logic states shared by said plurality of sets of executable logic states implemented using hardware logical gates and other hardware devices that are common to said first set of executable logic states and said second set of executable logic states;

an address register adapted to contain a pointer to a return address to a return state of one of said plurality of sets of executable logic states that is executing said subset of executable logic states;

said first set of executable logic states adapted to store a first pointer to a return address to a return state of said first set of executable logic states in said address register prior to executing said subset of executable logic states;

said second set of executable logic states adapted to store a second pointer to a return address to a return state of said second set of executable logic states in said address register prior to executing said subset of executable logic states;

said subset of executable logic states adapted to retrieve said pointer to said return address to said return state of said one of said plurality of sets of executable logic states that is executing said subset of executable logic states from said address register; and said subset of executable logic states adapted to continue executing one of said first set or said second set of executable logic states from said return state of said pointer within said address register.

9. The method of claim 1 further comprising at least one additional thread of execution in said plurality of threads of execution implemented using hardware logical gates and other hardware devices that transfers control to said common routine and gets control returned from said common routine as said first and said second threads transfer control to said common routine and get control returned from said common routine.

10. The method of claim 5 further comprising at least one additional set of executable logic states in said plurality of sets of executable logic states implemented using hardware logical gates and other hardware devices that executes said common set of executable logic states as said first and said second set of executable logic states execute said common set of executable logic states.

11. The integrated circuit of claim 7 further comprising at least one additional series of gates implemented using hardware logical gates and other hardware devices arranged to perform an additional thread of actions of said plurality of threads of actions, said additional thread of actions transferring control to and getting control returned from said first, common series of gates as said first and said second thread of actions transfer control to and get control returned from said first, common series of gates.

12. The integrated circuit of claim 8 further comprising at least one additional set of executable logic states of said plurality of sets of executable logic states implemented using hardware logical gates and other hardware devices such that said additional set of executable logic states contains said subset of executable logic states that are common to said first and said second set of executable logic states and said additional set of executable logic states executes said subset of executable logic states as said first and said second set of executable logic states.

* * * * *